US010029945B2

(12) United States Patent
Werz et al.

(10) Patent No.: US 10,029,945 B2
(45) Date of Patent: Jul. 24, 2018

(54) GEOPOLYMER-BINDER SYSTEM FOR FIRE CONCRETES, DRY FIRE CONCRETE MIX CONTAINING THE BINDER SYSTEM AND ALSO THE USE OF THE MIX

(71) Applicant: Refratechnik Holding GmbH, Ismaning (DE)

(72) Inventors: Jennifer Werz, Weidenhahn (DE); Bertram Kesselheim, Bad Hoenningen (DE); Darina Rudert, Oppenheim (DE); Kai Beimdiek, Witzenhausen (DE)

(73) Assignee: Refratechnik Holding GmbH, Ismaning (DE)

( * ) Notice: Subject to any disclaimer, the term of this patent is extended or adjusted under 35 U.S.C. 154(b) by 0 days.

(21) Appl. No.: 14/765,376

(22) PCT Filed: Jan. 29, 2014

(86) PCT No.: PCT/EP2014/051733
§ 371 (c)(1),
(2) Date: Aug. 3, 2015

(87) PCT Pub. No.: WO2014/118242
PCT Pub. Date: Aug. 7, 2014

(65) Prior Publication Data
US 2015/0376060 A1 Dec. 31, 2015

(30) Foreign Application Priority Data
Feb. 4, 2013 (DE) ........................ 10 2013 001 927

(51) Int. Cl.
| | |
|---|---|
| *C04B 12/00* | (2006.01) |
| *C04B 28/00* | (2006.01) |
| *C04B 28/10* | (2006.01) |
| *C04B 35/01* | (2006.01) |
| *C04B 35/043* | (2006.01) |
| *C04B 35/047* | (2006.01) |
| *C04B 35/63* | (2006.01) |
| *C04B 35/66* | (2006.01) |
| *C04B 35/76* | (2006.01) |
| *C04B 35/03* | (2006.01) |

(Continued)

(52) U.S. Cl.
CPC ............ *C04B 12/005* (2013.01); *C04B 28/00* (2013.01); *C04B 28/006* (2013.01); *C04B 28/008* (2013.01); *C04B 28/105* (2013.01); *C04B 35/013* (2013.01); *C04B 35/03* (2013.01); *C04B 35/043* (2013.01); *C04B 35/047* (2013.01); *C04B 35/10* (2013.01); *C04B 35/12* (2013.01); *C04B 35/14* (2013.01); *C04B 35/185* (2013.01); *C04B 35/48* (2013.01); *C04B 35/481* (2013.01); *C04B 35/482* (2013.01); *C04B 35/52* (2013.01); *C04B 35/565* (2013.01); *C04B 35/6303* (2013.01); *C04B 35/6316* (2013.01); *C04B 35/66* (2013.01); *C04B 35/76* (2013.01); *C04B 2111/28* (2013.01); *C04B 2235/3206* (2013.01); *Y02P 40/165* (2015.11); *Y02W 30/92* (2015.05); *Y02W 30/94* (2015.05)

(58) Field of Classification Search
CPC ... C04B 12/005; C04B 28/006; C04B 35/481; C04B 35/48; C04B 35/185; C04B 35/14; C04B 35/12; C04B 35/10; C04B 35/03; C04B 28/105; C04B 7/02; C04B 7/32; C04B 14/022; C04B 14/042; C04B 14/06; C04B 14/10; C04B 14/106; C04B 14/12; C04B 14/14; C04B 14/18; C04B 14/204; C04B 14/26; C04B 14/303; C04B 14/306; C04B 14/307; C04B 14/324; C04B 14/48; C04B 16/06; C04B 18/025; C04B 18/08; C04B 18/141; C04B 38/02; C04B 2111/28; C04B 2235/3206; C04B 2103/30
See application file for complete search history.

(56) References Cited

U.S. PATENT DOCUMENTS 4,276,091 A * 6/1981 Cassens, Jr. ...... C04B 35/63496
106/284
5,792,251 A 8/1998 Smiley et al.
(Continued)

FOREIGN PATENT DOCUMENTS

EP 0 119 812 A2 9/1984
EP 839 775 B1 5/1998
(Continued)

OTHER PUBLICATIONS

Borovikov, Roman: Research into wear of high-alumina refractory materials for ladle metallurgy in steelworks operation, dissertation, Apr. 7, 2002.
(Continued)

*Primary Examiner* — Anthony J Green
(74) *Attorney, Agent, or Firm* — Collard & Roe, P.C.

(57) ABSTRACT

An alkaline-activated binder system for fire concretes includes at least one mineral binder and a mineral activator which, in a mixture with water, form a curing geopolymer, where a combination of at least two magnesium components (Mg components) which give an alkaline reaction with water and react with the binder at different times to form a geopolymer is present as activator, where the magnesium components have a different reactivity in respect of atmospheric moisture and/or in respect of the binder. A dry fire concrete mix contains the binder system and the mix may be used in, for example, facilities in the steel industry.

24 Claims, 2 Drawing Sheets

Figure 1:
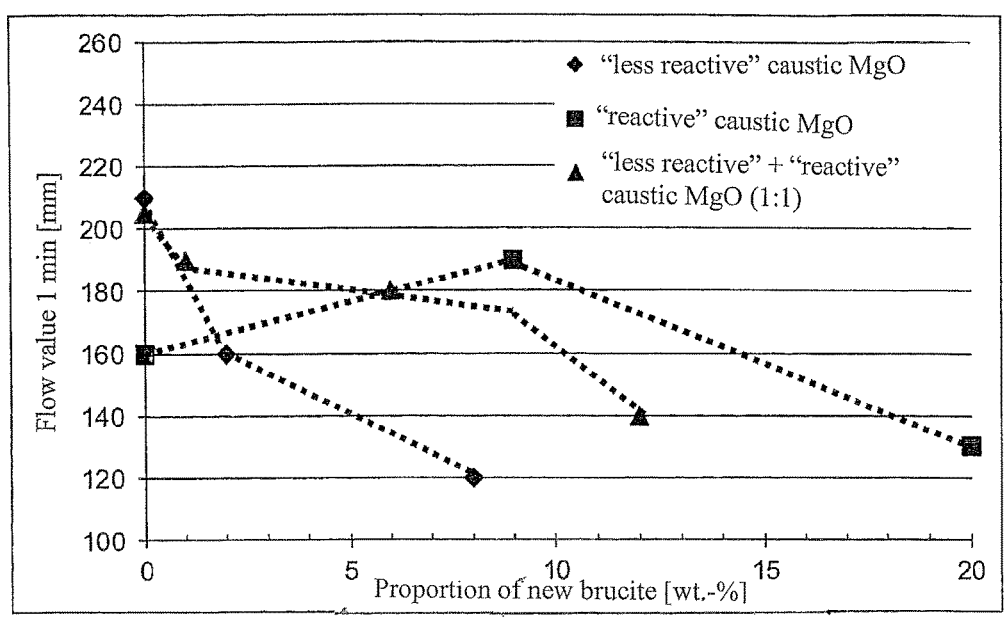

(51) Int. Cl.
- *C04B 35/10* (2006.01)
- *C04B 35/12* (2006.01)
- *C04B 35/14* (2006.01)
- *C04B 35/185* (2006.01)
- *C04B 35/48* (2006.01)
- *C04B 35/482* (2006.01)
- *C04B 35/52* (2006.01)
- *C04B 35/565* (2006.01)
- *C04B 111/28* (2006.01)

(56) References Cited

U.S. PATENT DOCUMENTS

| | | | |
|---|---|---|---|
| 6,548,435 B1 | 4/2003 | Bugajski | |
| 2010/0058957 A1* | 3/2010 | Boxley | C04B 28/006 106/709 |
| 2012/0152153 A1 | 6/2012 | Gong et al. | |

FOREIGN PATENT DOCUMENTS

| | | |
|---|---|---|
| EP | 0 940 376 A1 | 9/1999 |
| EP | 2 727 894 A1 | 5/2014 |
| JP | H07 223874 A | 8/1995 |
| KR | 2004 0055088 A | 6/2004 |
| KR | 2004 0056627 A | 7/2004 |
| RU | 2009108322 A | 9/2010 |
| WO | 99/12860 A1 | 3/1999 |
| WO | 2008/017413 A1 | 2/2008 |
| WO | 20091005205 A1 | 1/2009 |

OTHER PUBLICATIONS

International Search Report of PCT/EP2014/051733, dated Apr. 8, 2014.
DIN EN 1402-1:2003, Unshaped refractory products—Part 1: Introduction and classification, Oct. 2003, 20 pages.
DIN EN 1402-4:2003, Unshaped refractory products—Part 4: Determination of consistency of castables, Oct. 2003, 22 pages.
DIN EN 1402-6: 2003, Unshaped refractory products—Part 6: Measurement of physical properties, Oct. 2003, 24 pages.
Soudier, J., QD NCC: Quick drying no cement castables. A novel non-cementitious mineral bond permitting flexible installation and extreme rapid heating up. 53rd International Colloquium on refractories 2010, Eurogress Aachen, Germany, pp. 115-118.
Malkmus, P., Soudier, J., Meunier, P., Bardin, V: QD NCC: Quick drying no cement castables implementation of a novel bond system in castables for diverse applications. 53rd International Colloquium on refractories 2010, Eurogress Aachen, Germany, pp. 119-122.
Refractory Technology, Increased system availability and energy savings by means of quick-drying, cement-free cast concretes, messedaily GIFA 2011, Dusseldorf, p. 14.
Innovation & Solutions, Quick drying wins out at Daimler, Refracstories, Calderys Employee Newspaper, Dec. 2010, Issue 13, p. 6.
Calderys: Simply gain time, messedaily 2011, Dusseldorf, p. 3.
Innovation & Solutions, A year of innovation, Refracstories, Calderys Employee Newspaper, Jun. 2010, Issue 12, p. 9.
Soudier, J., QD NCC: Quick drying no cement castables. A novel non-cementitious mineral bond permitting extreme rapid dry out of monolithic refractory linings. UNITECER 2011, Kyoto, Japan, 1-D-17, 4 pages.
Soudier, J., Malkmus, P., Meunier, P., Bardin, V.: QD NCC: Quick Dry No Cement Castables. Implementation and evaluation of performances of a novel bond system in castables for diverse applications. UNITECR 2011, Kyoto, Japan, 1-D-18, 4 pages.
Oldin, J., Fowler, A., Soudier, J., QD NCC: Quick Dry No Cement Castables. Industrial feedback on implementation of a novel bond system in castables for foundry applications. UNITECR 2011, Kyoto, Japan, 1-D-19, 4 pages.
Wagner, Dr. V., Louen, M.: Risk-less Heating-Up with Quick Dry Materials, Presentation PetroCem, 7th Int., Cement Conference, 2012, 18 pages.
G. Routschka, H. Wurthnow: "Praxishandbuch Feuerfeste Werkstoff, 5. Auflage" (Pocket Manual of Refractory Materials), Oct. 14, 2011 (Oct. 14, 2011), Vulkan Verlag, pp. 157-165 (pp. 280-293 English version).
Borovikov, Roman: Untersuchungen zum Verschleiss hochtonerde haltiger Feuerfestmaterialien fuer die Pfannenmetallurgie im Stahlwerksbetrieb, dissertation, Apr. 7, 2002.
Sean O'Connor, Synthesis and thermal treatment of lithium- and magnesium-containing geopolymers, A thesis submitted to the Victoria University of Wellington in partial fulfilment of the requirements for the degree of MSc in Chemistry 2009, 158 pages.
H. Pöllmann (Ed.), "Cementitious Materials," pp. 340-341 (Dec. 2017).

\* cited by examiner

GEOPOLYMER-BINDER SYSTEM FOR FIRE CONCRETES, DRY FIRE CONCRETE MIX CONTAINING THE BINDER SYSTEM AND ALSO THE USE OF THE MIX

CROSS REFERENCE TO RELATED APPLICATIONS

This application is the National Stage of PCT/EP2014/051733 filed on Jan. 29, 2014, which claims priority under 35 U.S.C. § 119 of German Application No. 10 2013 001 927.3 filed on Feb. 4, 2013, the disclosure of which is incorporated by reference. The international application under PCT article 21(2) was not published in English.

The invention relates to a mineral geopolymer binder system for liquefied or non-liquefied fire concretes, to a dry fire concrete mix containing the binder system, as well as to the use of the mix.

Fire concretes are non-formed refractory products. According to the standard DIN EN 1402-1, Chapter 4.1.1, fire concretes are mixtures of refractory aggregates and binder(s). They are generally delivered as a dry mix and processed to form fresh fire concrete after the addition of water or of another liquid and suitable mixing. They are installed by means of pouring with vibration, pouring without vibration (self-flow), by means of poking, spraying, or, if necessary, tamping. Binding and curing take place without heating. A liquefied fire concrete mix is supposed to contain a mass proportion of at least 2% ultra-fine particles (smaller than one micrometer) and at least one liquefaction agent, according to Chapter 4.3.1.

A distinction between fire concretes is made, among other things, according to their CaO content, and they are grouped accordingly into medium-cement fire concretes (MCC), low-cement fire concretes (LCC), ultra-low-cement fire concretes (ULCC), and cement-free fire concretes (NCC). The invention concerns itself with cement-free liquefied or non-liquefied fire concretes. These are refractory, monolithic construction materials. Cement-free means, according to DIN EN 1402-1, that maximally 0.2 wt.-% CaO coming from cements, for example, is allowed to be contained in the fire concrete mix.

Quick-drying and quick-heatable, cement-free, refractory fire concrete mixes that are processed solely with water are already available on the market. The properties of the fire concretes produced from them are described, for example, in Soudier, J., QD NCC: Quick drying no cement castables. A novel non-cementitious mineral bond permitting flexible installation and extreme rapid heating up. 53$^{rd}$ International Colloquium on refractories 2010, Eurogress Aachen, Germany, pp. 115-118.

Malkmus, P., Soudier, J., Meunier, P., Bardin, V.: QD NCC: Quick drying no cement castables implementation of a novel bond system in castables for diverse applications. 53$^{rd}$ International Colloquium on refracstories 2010, Eurogress Aachen, Germany, pp. 119-121.

Refractory Technology, Increased system availability and energy savings by means of quick-drying, cement-free cast concretes, messedaily GIFA 2011, Dusseldorf, p. 14.

INNOVATION & SOLUTIONS, Quick drying is the victor at Daimler, Refractories, Calderys Employee Newspaper, December 2010, Issue 13, p. 5.

Calderys: Simply gain time, messedaily 2011, Dusseldorf, p. 3.

INNOVATION & SOLUTIONS, A year of innovation, Refractories, Calderys Employee Newspaper, June 2010, Issue 12, p. 8-9.

Soudier, J., QD NCC: Quick drying no cement castables. A novel non-cementitious mineral bond permitting extreme rapid dry out of monolithic refractory linings. UNITECR 2011, Kyoto, Japan, 1-D-17.

Malkmus, P., Soudier, J., Meunier, P., Bardin, V.: QD NCC: Quick Dry No Cement Castables. Implementation and evaluation of performance of a novel bond system in castables for diverse applications. UNITECR 2011, Kyoto, Japan, 1-D-18.

Oldin, J., Fowler, A., Soudier, J., Quick Dry No Cement Castables. Industrial feedback on implementation of a novel bond system in castables for foundry applications. UN ITECR 2011, Kyoto, Japan, 1-D-19.

Wagner, Dr. V., Louen, M.: Risk-Less Heating-up with Quick Dry Materials Presentation PetroCem, 7$^{th}$ Int., Cement Conference, 2012.

The refractory fire concretes (English: "castables") described in this prior art are liquefied fire concretes. For the dry mixes (mixtures) for these fire concretes, which only have to be mixed with water, it is known that they are generally products on the basis of $Al_2O_3$—$SiO_2$ and contain andalusite, bauxite, refractory clay, mullite or corundum as the main raw material component, for example, and a mineral, quick-drying and quick-heatable binder system. The mixes must generally be processed within 4 months, because otherwise, the predetermined properties of the binder system can no longer be guaranteed, due to hydration reactions caused in the Meantime, for example by humidity in the air. Accordingly, a guaranteed storage period of 4 months is indicated for fire concrete mixes delivered in Big Bags and of 6 months for mixes delivered as bagged goods. Mixes for liquefied fire concretes are known from EP 839 775 B1, which have 30-80 wt.-% of a refractory main component having grain sizes above 74 μm (200 mesh), 1-30 wt.-% fine-particle refractory material having grain sizes <74 μm (200 mesh), as well as a cement-free binder system composed of what is called a binder in the form of a hydratable aluminum oxide ($Al_2O_3$) and what is called an activator in the form of a dead-burnt magnesium oxide (MgO). Particularly because of the tendency of MgO to react with moisture in the air, for example, to form $Mg(OH)_2$ (brucite), these mixes also have only a relatively short storage stability or shelf life with regard to the originally set and desirable fresh concrete and hard concrete properties.

A mix for a liquefied fire concrete is known from WO 99/12860 A1, which has a calcium-aluminate cement and an additive composed of powdered amorphous metakaolin as the binder and microsilica as the activator, in addition to the coarse-grain and fine-particle main component. The additive is supposed to act on the binding and curing reactions of the cement.

An alkali-activated binder system is known from WO 2009/005205 A1, composed, among other things, of metakaolin as the binder and an alkali compound as the activator, which system is suitable for the production of wall mortars.

A binder system is known from US 2012/0152153 A1, composed, among other things, of metakaolin as the binder and an alkali activator solution for it, composed of a metal hydroxide and a metal silicate, which mix is used for the production of normal concrete.

In all the cement-free binder/activator systems, what is called a curable geopolymer is formed after water enters. A geopolymer consists of Si and Al atoms, which are bound into a polymer network by way of oxygen atoms. The process of geopolymer formation takes place by way of solution, condensation, poly-condensation and polymerization reactions. A very dense and durable geopolymer matrix having extremely great mechanical strength is formed.

It is known that the processing properties and green properties and also the strengths after the curing process can be adjusted, for example by means of the fineness of the binder and activator, the reactivity of the binder, the alkali concentration of an activator solution (pH≥9.5), and also by way of the interaction between binder and activator.

Depending on the combination, however, an overly delayed or accelerated reaction behavior between binder and activator can occur and can cause overly low green strengths and final strengths.

Normally, setting values in the production of fresh fire concrete should be selected as follows, at a reference temperature of 20±5° C., wherein a water requirement that is reduced as far as possible is to be aimed at, for example by means of admixtures:

conversion point in the mixer from dry to liquid or processable consistency within 120 seconds,
open working time of the fresh fire concretes of 30 minutes,
optimal working consistency for high compaction or high strengths, i.e. after the wet mixing time, flow values after 1 minute of ≥170 mm should be present within the indicated batch-up water span typical for the type (DIN EN 1402-4),
reliable binding after 1 hour to 24 hours in the temperature range of 0-40° C.,
quick curing for high green strengths ≥1, particularly ≥5 MPa after 24 hours binding time.

In comparison with cement-bound fire concretes, gas permeability that is higher by 2 to 5 times, for example, is a further characteristic of the geopolymer matrix frequently required for reliable and accelerated drying with a temperature increase in situ. This gas permeability is generally guaranteed by a relatively high synthetic fiber proportion of 0.05 wt.-% and, if necessary, by means of adding porosity-forming agents. The synthetic fibers produce pores that increase the gas permeability, by melting when the temperature is raised.

A significant problem in the known mixes for liquefied fire concretes is—as has already been mentioned above—the aging sensitivity of the very fine-particle and reactive binder system components, which tend to become hydrated. A significant loss in reactivity, in particular, or a change in reactivity, particularly of the binder system, results from the hydration. In general, the water requirement for optimal processing properties and for good flow behavior and compaction capacity increases as a result. Longer curing times and lower green strengths and final strengths are an accompanying result.

It is the task of the invention to create a geopolymer binder system for fire concretes, which system guarantees improved storage stability for dry fire concrete mixes, without the originally set properties of the binder system unacceptably changing when make-up water is added, and thereby, in particular, the processability, binding, and curing of the preset mix unacceptably changing after an extended period of storage, in comparison with the state of the art.

This task is accomplished by a binder system that reacts when it comes into contact with make-up water, and has a) as a mineral binder, for example, a reactive, fine-particle aluminum silicate, particularly in the form of metakaolin and/or tempered clay and/or brick dust, and/or an earth alkali aluminum silicate, particularly in the form of anthracite flue ash and/or granulated slag (blast furnace slag), and/or a lime/sandstone powder and/or an amorphous silica, particularly in the form of microsilica,
b) as a mineral activator, the combination of at least two fine-particle, dry Mg components, forming an alkaline solution with water, particularly in the form of MgO produced by burning of magnesite or dolomite, or by means of precipitation from brucite, or by means of thermal splitting from magnesium chloride or magnesium sulfate or magnesium sulfide, or by means of extraction from dolomite, in the form of what is called caustic MgO and/or in the form of MgO produced by means of sintering or melting.

Mg components in the sense of the invention are mineral products that contain MgO and react with water in alkaline manner, as indicated above under b), for example, MgO products, but also mineral raw materials that contain Mg and/or products such as olivine, forsterite, dunite, brucite, dolomite, spinel.

In the following, mineral binders of the binder system according to the invention are indicated as examples.

Particularly suitable aluminum silicates for the purposes of the invention are fine-particle metakaolins, fine-particle clays, fine-particle brick dusts, fine-particle blast furnace slags, and fine-particle flue ashes.

Metakaolin is a highly reactive aluminum silicate pozzolan. According to the invention, it is used in very fine-particle form, for example with grain sizes between 0 and 500 µm, particularly between 1 and 120 µm. The production and the properties of amorphous metakaolins suitable for the purposes of the invention are described, for example, in WO 99/12860 A1 and in the U.S. Pat. No. 5,792,251.

Within the scope of the description of the invention, the statement "grain sizes between 0 and x µm" means a grain size distribution, determined by means of fractionated screening, for example, using screens having a standardized mesh width all the way up to the mesh width "x" and/or by means of laser granulometry and/or sedimentation of the particles in a liquid in accordance with Stokes' Law.

Metakaolin is used as a binder in the geopolymer binder system in amounts between 40 and 99 wt.-%, particularly between 50 and 80 wt.-%, with reference to the amount of the binder system. The rest is at least one activator, in each instance.

Granulated slag is an essentially vitreous silicate material. Granulated slags having the following composition in wt.-% can be used for the purposes of the invention:

| | |
|---|---|
| $SiO_2$ | 35 to 40 |
| $Al_2O_3$ | 8 to 14 |
| $Fe_2O_3$ | <0.5 |
| MnO | <1.5 |
| CaO | 33 to 43 |
| MgO | 4 to 12 |
| S | 1.0 to 1.6 |

It is practical if the grain sizes of the granulated slags lie between 0 and 20 µm, particularly between 0 and 12 µm. The granulated slags are used in amounts between 40 and 99 wt.-%, particularly between 50 and 80 wt.-%, with reference to the amount of the binder system. The rest is at least one activator, in each instance.

Anthracite flue ash is a fine mineral dust having a light-gray to dark-gray or light-brown color. As a result of the high combustion temperatures, anthracite flue ash consists predominantly of spherical, vitreous particles. Anthracite flue ash consists predominantly of silicon oxide, aluminum oxide, and iron oxide. In addition, it contains various trace elements. Anthracite flue ash can furthermore contain small amounts of residual coke.

Flue ashes having the following composition in wt.-% can be used for the invention:

| | |
|---|---|
| SiO$_2$ | 40 to 50 |
| Al$_2$O$_3$ | 23 to 35 |
| Fe$_2$O$_3$ | 4 to 17 |
| TiO$_2$ | 0.5 to 1.3 |
| CaO | 1 to 8 |
| MgO | 0.8 to 4.8 |
| K$_2$O | 1.5 to 5.5 |
| Na$_2$O | 0.1 to 3.5 |
| SO$_3$ | 0.1 to 2.0 |

It is practical if the grain sizes of the flue ashes lie between 0 and 500 μm, particularly between 0 and 100 μm. The flue ashes are used in amounts between 40 and 99 wt.-%, particularly between 50 and 80 wt.-%, with reference to the amount of the binder system. The rest is at least one activator, in each instance.

Further binders that can be used, particularly earth alkali silicates, are tempered clays, which can have not only kaolinite but also smectite/montmorillonite or illite as the main mineral. Tempered clays having the following composition in wt.-% can be used for the invention:

| | |
|---|---|
| SiO$_2$ | 50 to 70 |
| Al$_2$O$_3$ | 15 to 20 |
| Fe$_2$O$_3$ | 2 to 5 |
| TiO$_2$ | 0.2 to 1 |
| CaO | 0.7 to 5 |
| MgO | 2 to 4 |
| K$_2$O | 0.2 to 1 |
| Na$_2$O | 2 to 3 |

It is practical if the grain sizes of the tempered clays lie between 0 and 500 μm, particularly between 1 and 120 μm. The tempered clays are used in amounts between 40 and 99 wt.-%, particularly between 50 and 80 wt.-%, with reference to the amount of the binder system. The rest is at least one activator, in each instance.

Amorphous silica consists essentially of very small, highly reactive spherical particles. Types of microsilica having the following composition can be used for the purposes of the invention:

| | | |
|---|---|---|
| SiO$_2$ | wt.-% | 92 to 99.9% |
| Al$_2$O$_3$ | wt.-% | 0.1 to 0.8% |
| Fe$_2$O$_3$ | wt.-% | 0.1 to 1.5% |
| P$_2$O$_5$ | wt.-% | 0.1 to 0.4% |
| CaO | wt.-% | 0.1 to 1.0% |
| MgO | wt.-% | 0.1 to 1.6% |
| K$_2$O | wt.-% | 0.1 to 1.7% |
| Na$_2$O | wt.-% | 0.1 to 0.7% |
| ZrO$_2$ | wt.-% | 0.1 to 6.0% |
| GV | wt.-% | 0.3 to 4.0% |

It is practical if the grain sizes of the amorphous silica lie between 0 and 100 μm, particularly between 0 and 10 μm. Amorphous silica is used in amounts between 40 and 99 wt.-%, particularly between 50 and 85 wt.-%, with reference to the amount of the binder system. The rest is at least one activator, in each instance.

Lime/sandstone powder is ground lime/sandstone from construction material production. Lime/sandstone powders having the following composition in wt.-% can be used for the purposes of the invention:

| | |
|---|---|
| SiO$_2$ | 90 to 96 |
| CaO | 4 to 8 |
| MgO | 0 to 2 |

It is practical if the grain sizes of the lime/sandstone powders lie between 0 and 100 μm, particularly between 0 and 70 μm. The lime/sandstone powders are used in amounts between 40 and 99 wt.-%, particularly between 50 and 80 wt.-%, with reference to the amount of the binder system. The rest is at least one activator, in each instance.

Brick dust is a recycling product having a high amorphous proportion of crushed bricks.

Brick dusts having the following composition in wt.-% can be used for the purposes of the invention:

| | |
|---|---|
| Al$_2$O$_3$ | 10 to 45 |
| SiO$_2$ | 50 to 85 |
| Fe$_2$O$_3$ | 1 to 16 |
| CaO | 0.1 to 12 |
| MgO | 0.1 to 4 |
| K$_2$O | 0.1 to 3 |
| Na$_2$O | 0.1 to 4 |
| TiO$_2$ | 0.1 to 2 |

It is practical if the grain sizes of the brick dusts lie between 0 and 100 μm, particularly between 0 and 70 μm. The brick dusts are used in amounts between 40 and 99 wt.-%, particularly between 50 and 80 wt.-%, with reference to the amount of the binder system. The rest is at least one activator, in each instance.

It lies within the scope of the invention to establish binder systems that have at least two of the stated binders. The respective amount of the binder used or of the at least two binders is directed, in this connection, by the properties to be guaranteed. The binder or the at least two binder combinations is/are used, for example, in amounts between 40 and 99 wt.-%, particularly between 50 and 80 wt.-%, with reference to the amount of the binder system.

In the following, mineral activators of the binder system according to the invention will be indicated as examples.

At least two Mg components that react with water in alkaline manner should be used as an activator. Mg components that contain MgO are, for example, caustic MgO or deadburnt sintered or melted MgO. These MgO products are available on the market. They are, in particular, products that are calcined or burnt from magnesite or brucite. Furthermore, MgO-rich spinel, magnesium silicates such as olivine, forsterite, dunite, additives containing Mg such as sodium phosphate that contains MgO, brucite and/or dolomite can be used as the Mg component.

It is known that different calcined or dead-burnt MgO products can generally react with moisture, at different speeds, to form brucite (Mg(OH)$_2$), and that brucite formation has a negative influence on the reaction capacity of the MgO with regard to water and the binder component of the binder system.

The long-term change in reaction capacity of the Mg component that contains MgO can be tested in advance by means of a standardized, simulating measurement method developed independently or in house, for example in a climate-controlled cabinet at a specific temperature and a specific humidity and specific time intervals. In each instance, the water absorption is measured after a specific period of effect, and thereby the brucite formation is measured. It is practical if this measurement method is carried out as follows or standardized:

MgO material samples to be tested are pre-weighed and stored in a climate-controlled cabinet at a specific temperature, for example between 30 and 35° C., and at a specific relative humidity of 80 to 85%, for example, for 1 to 168 hours, for example. After predetermined storage times, sample material is removed, in each instance, and dried in a drying cabinet at a temperature of 110° C., for example, for 1 hour, for example, and weighed again. The increase in weight caused by hydration is stoichiometrically calculated to obtain the brucite amount.

After the time-dependent brucite formation has been established according to the independently developed, standardized, climate-controlled cabinet method, it is possible to empirically determine the reaction capacity with the binder from the climate-controlled cabinet test, using the MgO material samples that contain brucite in different amounts, and from that, a conclusion can be drawn with regard to the storage capacity of the binder system, in months, wherein the reaction capacity can be checked, for example by means of the transition point in the wet mixing process, or the degree of spread, or the binding behavior according to the beaker test or the ultrasound method, or a determination of the green strength according to DIN EN 1402, Part 6.

The reaction capacity of the binder system is preferably checked using the known degree of spread method. This degree of spread method is carried out, within the scope of the invention, according to DIN EN 1402-4, Non-formed refractory products—Part 4: Determination of the consistency of refractory concretes; German version EN 1402-4: 2003.

With knowledge of the brucite formation, one could set the possible storage period with a single, tested MgO product. However, since the MgO products that guarantee a longer storage period cause relatively poor processability and poor binding and curing, this measure is not necessarily expedient.

The inventors have found out that it can be guaranteed, by means of the combination of at least two Mg components, particularly at least two MgO products having different reactivity with regard to humidity or brucite formation or reaction with a binder in a binder system according to the invention or in a fire concrete mix according to the invention, that the processability, the flow behavior, binding behavior, and curing behavior that a binder system or a mix that contains the binder system initially guarantees after production is maintained over a longer storage period than before, of over 6 months, for example, almost unchanged up to a predeterminable maximal storage period of 6 months, for example.

In this connection, the combination of at least two caustic MgO compounds having different moisture absorption and brucite formation, in terms of time, is used, according to the invention, wherein the one caustic compound is more reactive and therefore reacts more quickly, and the other caustic compound is less reactive and reacts more slowly. Further combinations have the combination, for example, of at least one more reactive caustic MgO and at least one less reactive, dead-burnt MgO or, for example, the combination of at least one more reactive caustic MgO and at least one less reactive MgO spinel, or the combination of at least one more reactive caustic MgO and at least one less reactive raw material or product containing Mg, for example forsterite or olivine or another magnesium silicate such as dunite or serpentinite.

The invention includes, for example, the following activator combinations:

| More reactive component | less reactive component |
|---|---|
| caustic MgO + | caustic MgO + additive containing MgO |
| caustic MgO + | caustic MgO + brucite |
| caustic MgO + | caustic MgO + dolomite |
| caustic MgO + | brucite |
| dead-burnt magnesia + | spinel, particularly Mg-excess spinel |
| dead-burnt magnesia + | mineral containing Mg (forsterite, olivine, dunite) |
| dead-burnt magnesia + | dolomite |
| dead-burnt magnesia + | brucite |
| spinel, particularly MgO-excess spinel + | additive containing MgO |
| spinel, particularly MgO-excess spinel + | dolomite |
| spinel, particularly MgO-excess spinel + | brucite |
| mineral containing MgO + | additive containing MgO |
| mineral containing MgO + | dolomite |
| mineral containing MgO + | brucite |

An activator combination according to the invention is mixed with at least one binder of the type indicated above, and, for example, the transition point, the degree of spread or the flow value is/are measured after 1 minute and 25 minutes, and the binding behavior and the curing properties are measured as a function of the storage period. To establish maximal storage stability, some tests must be conducted, which include the refractory aggregates, additives, and admixtures of the fire concrete mix that are used, in each instance.

For example, a combination of MgO products according to the invention can be determined as follows.

A more reactive caustic MgO having an average grain size $d_{50}=5$ μm, a high MgO purity >98 wt.-%, and strong brucite formation at 30° C. and 80% relative humidity of >5 wt.-% after 24 hours is used. Furthermore, a less reactive caustic MgO having an average grain size $d_{50}=50$ μm, a lower MgO purity of 96 wt.-%, and a lower reactivity for brucite formation at 30° C. and 80% relative humidity of <3% after 24 hours is used.

With the more reactive caustic compound, the less reactive caustic compound, and a mixture of the two caustic compounds in a ratio of 1:1, the following fire concrete mixes were produced, in each instance from a basic mix composed of Aggregate: 66.5 wt.-% melted corundum
Additive: 25 wt.-% alumina meal
    4.5 wt.-% microsilica
Binder: 2.5 wt.-% metakaolin
and
a) 1.50 wt.-% more reactive caustic compound,
b) 1.50 wt.-% less reactive caustic compound,
c) 1.50 wt.-% of a mixture of the two caustic compounds in a weight ratio of 1:1.

5.5 wt.-% water was added to these mixes and the mixes were mixed, and afterward, the flow value was determined according to DIN EN 1402-4 after one minute, and the cold pressure strength of standard test bodies produced from the mixture was determined after 24 hours of storage at 20° C.

Figure 2:
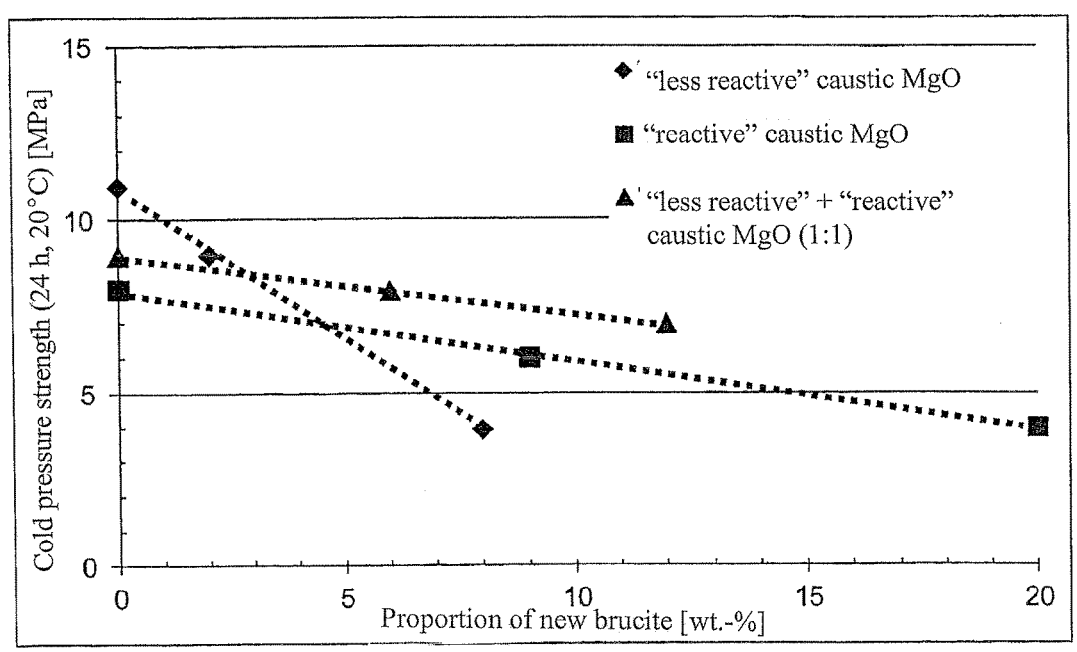

The result is shown in FIG. 1 for the flow value as a function of the amount of brucite formation of the caustic compounds or the combination of caustic compounds, and FIG. 2 shows the result for the pressure strength. FIG. 1 shows the change in flow values (1 min) as a function of the newly formed proportion of brucite when using the less reactive caustic compound, the reactive caustic compound, as well as a mixture of the two activators. FIG. 2 shows the change in the cold pressure strength after a 24 h curing period as a function of the newly formed proportion of brucite when using the less reactive and the reactive caustic compound, as well as the mixture of the two activators.

The flow values characterize the processability of the mixtures, which are supposed to be maintained at above 170 mm over a period of months, if possible. Likewise, the cold pressure strength is supposed to be maintained; it is an indication of the final strengths that are achieved.

It can be seen from FIG. 1 that acceptable flow values can be guaranteed right from the start, up to relatively high brucite values (9 wt.-%) by means of the combination of caustic compounds.

It can be seen from FIG. 2 that the pressure strength is maintained at a relatively high level at elevated brucite values, by means of the combination of caustic compounds.

The example shows the effect of a combination of caustic compounds with a specific binder. The same results are obtained with other activator combinations and other binders; this is plausible to a person skilled in the art.

It has been shown that the following combinations of MgO components are resistant to changes in properties for a particularly long time:

In the following, compositions for fire concrete mixes are indicated as examples, in wt.-% with reference to the total mix=100 wt.-%.

a) Binder System
  1.01-37.5, particularly 3.0 to 22.5, with the following mixture amounts of binder/activator in wt.-%:
  binder: 1-15, particularly 2-15,
  activator: 0.01-22.5, particularly 1.0-7.5,
b) Mineral Aggregates
  62.5-98.99, particularly 87.5-97.0 of at least one aggregate having a usual grain distribution from meal fraction to coarse grain of up to 15 mm, for example, selected from the following group, for example:
  light aggregates such as vermiculite, pearlite, expanded clay,
  acidic/alumina-rich refractory clay,
  andalusite/sillimanite,
  mullite,
  bauxite,
  calcium hexa-aluminate,
  sintered corundum,
  melted corundum (BFA, 94-97% $Al_2O_3$),
  melted corundum (WFA, >99% $Al_2O_3$),
  raw materials containing zirconium oxide (zirconia, AZS),
  magnesia,
  forsterite (olivine),
  doloma,
  silicon carbide,
  zirconium (zirconium silicate),
  quartz sand,
  spinel,
  graphite, coke, carbon black,
  chromium ore, chromium oxide,
c) Fine-Particle Mineral Additives
  binder clay up to 15, particularly 1-10,
  microsilica up to 9, particularly 3-5,
  alumina meal up to 30, particularly 5-20,
  alumina cement (15-32% CaO) up to 0.6, partic. 0.1-0.3,
  alumina melt cement (32-39% CaO) up to 0.5, partic. 0.1-0.25,
  Portland cement up to 0.25, partic. 0.1-0.15,
d) Admixtures
  additives such as liquefiers,
  binding regulators 0-0.5, partic. 0.1-0.15,
  aluminum hydroxide 0-0.5,
  pore-forming agents 0-0.5,
  stainless steel fibers 0-3.0,
  synthetic fibers 0-0.3, partic. 0.1-0.15.

The invention is particularly characterized by the following characteristics:

The invention contains an alkali-activated binder system for fire concretes, composed of at least a mineral binder and a mineral activator, which form a curing geopolymer in a mixture with water, wherein a combination of at least two magnesium components (Mg components) that react with water in alkaline manner and, in this connection, reactively form a geopolymer with the binder in different manner, in terms of time, is contained as an activator, wherein the Mg components demonstrate a different reactivity with regard to humidity in the air, in that the one Mg component binds more moisture or water during a specific time at a specific relative humidity than the other Mg component and/or a different reactivity with regard to the binder, which changes over time.

It is advantageous if the activator contains at least one MgO product as the Mg component.

It is furthermore advantageous if the activator contains at least one MgO product and at least one Mg component that reacts with water in alkaline manner and does not have any MgO product, or consists of the two Mg components.

It is practical if the activator has only MgO products as Mg components or consists only of MgO products.

It is particularly advantageous if the activator has at least two caustic MgO compounds as Mg components, particularly consists of two caustic MgO compounds.

Within the scope of the invention, it was determined that the activator combinations should be selected from the following group of Mg components: caustic MgO, dead-burnt MgO in the form of melted and/or sintered magnesia, MgO-excess spinel, spinel, brucite, magnesium silicates such as forsterite, olivine, dunite, serpentinite, additives containing MgO such as sodium phosphate that contains MgO.

It is advantageous if the binder system contains, as a binder, at least one fine-particle, preferably amorphous aluminum silicate that is reactive with the activator, and it is particularly practical if this is selected from the group of metakaolin, tempered clay, brick dust, anthracite flue ash, granulated slag. Furthermore, lime/sandstone powder and amorphous silica can be used very well as binders.

It is advantageous if the binder system contains between 0.01 and 22.5 wt.-%, particularly between 1.0 and 7.5 wt.-% activator, and between 1 and 15, particularly between 2 and 15 wt.-% binder.

In a fire concrete mix, a binder system according to the invention easily has an effect if the fire concrete mix at least has at least one aggregate composed of one or more refractory materials having a usual grain distribution for fire concrete mixes. The binder system should preferably be contained in the following amounts in wt.-%: 1-15, particularly 2-15 binder, 0.01-22.5, particularly 1.0-7.5 activator.

It is advantageous to select the aggregates listed in the specification and to use at least one of them, specifically preferably in amounts between 62.5 and 98.99, particularly between 87.5 and 97.0 wt.-%. The fire concrete mixes according to the invention can furthermore have at least one aggregate and at least one admixture, each selected from the groups listed in the specification, preferably in the amounts indicated in the specification.

The fire concrete mixes according to the invention are preferably used in facilities sectors in the steel industry, for example steel pan, tundish, steel pan edge, perforated bricks, gas flushing cones, electric furnace cover, as well as in furnace units for pig iron production, for example blast furnace shaft, main gutter, iron gutter, slag gutter, tilting gutter, and pig iron treatment, for example pig iron pans, pig iron mixers, and also for pig iron transport, for example particularly for the provision of torpedo transport containers, particularly torpedo discharge spouts, furthermore for maintenance spraying of previously worn areas of a torpedo transport container. Furthermore, the fire concrete mixes are used in furnace assemblies of the aluminum industry, for example in aluminum melting furnaces, aluminum treatment furnaces or holding furnaces, in the bath region, as well as in the side walls of the upper furnace, the ceiling delivery, in the ramp region, in the filling shaft and in the region of the melt bridges. In waste incineration facilities, for example in the filling region, in side walls and ceilings, in power plants, predominantly in the region of the heating boilers and flue gas return suction shafts, as well as in foundries, for example for monolithic pan delivery, for delivery of casting spouts and gutter systems, the fire concretes according to the invention can be used to particular advantage because of their superior properties.

The fire concrete mixes according to the invention are preferably also used in facility sectors of clinker production in the cement industry, particularly in zones ahead of, in a or behind a cement kiln, in which first drying of the monolithic delivery by means of the first hot clinker takes place, for example. The zones extend, for example, from the nose ring, circulation ring all the way to the wear benches in the cooler.

The invention claimed is:
1. A dry alkaline-activated, cement-free binder composition for cement-free refractory concretes, composed of at least a mineral binder and a mineral activator, which form a curing geopolymer in a mixture with water,
   wherein a combination of at least two magnesium components that form with water an alkaline solution and thereby reactively form a geopolymer with the mineral binder, is contained as the mineral activator, and
   wherein the magnesium components comprise a different reactivity with regard to humidity in the air and with regard to the mineral binder,
   wherein the mineral binder comprises at least one of an amorphous aluminum silicate that is reactive with the mineral activator and forms Si—O—Al bindings and a binder that forms Si—O—Si bindings,
   wherein the amorphous aluminum silicate is selected from the group consisting of: metakaolin, tempered clay, brick dust, anthracite flue ash, and granulated slag,
   wherein the binder that forms Si—O—Si bindings is selected from the group consisting of: lime/sandstone powder, amorphous silica, and a combination of lime/sandstone powder and amorphous silica, and
   wherein the composition contains 80 to 99 wt.-% mineral binder.
2. The binder composition according to claim 1, wherein the mineral activator contains at least one magnesium oxide compound as the magnesium component.
3. The binder composition according to claim 2, wherein the mineral activator contains at least one magnesium oxide compound as the magnesium component and at least one magnesium component that does not have any magnesium oxide.
4. The binder composition according to claim 2, wherein the mineral activator contains only MgO compounds as magnesium components.
5. The binder composition according to claim 2, wherein the mineral activator has at least two caustic MgO compounds as magnesium components.
6. The binder composition according to claim 1, wherein the mineral activator combination are magnesium components selected from the group consisting of: caustic MgO, dead-burnt MgO in the form of melted and/or sintered magnesia, MgO-excess spinel, spinel, brucite, magnesium silicates and additives containing MgO.
7. The binder composition according to claim 3, wherein the mineral activator consists of one magnesium oxide compound as the magnesium component and one magnesium component that does not have any magnesium oxide.
8. The binder composition according to claim 5, wherein the mineral activator consists of two caustic MgO compounds.
9. The binder composition according to claim 6, wherein the magnesium silicates are selected from the group consisting of forsterite, olivine, dunite and serpentinite.
10. The binder composition according to claim 6, wherein the additive containing MgO is sodium phosphate that contains MgO.
11. A dry refractory concrete mix, at least containing at least one aggregate composed of refractory material and at least one binder composition that forms a geopolymer with water, according to claim 1.
12. The refractory concrete mix according to claim 11, containing at least one aggregate selected from the group consisting of:
   lightweight aggregates,
   acidic/alumina-rich refractory clay,
   andalusite/sillimanite,
   mullite,
   bauxite,
   calcium hexa-aluminate,
   sintered corundum,
   melted corundum (brown fused alumina, 94-97% $Al_2O_3$),
   melted corundum (white fused alumina, >99% $Al_2O_3$),
   raw materials containing zirconium oxide (zirconia, AZS),
   magnesia,
   forsterite (olivine),
   doloma,
   silicon carbide,
   zirconium (zirconium silicate),
   quartz sand,
   spinel,
   graphite,
   coke,
   carbon black,
   chromium ore,
   chromium oxide.
13. The refractory concrete mix according to claim 11, containing at least one fine-particle mineral additive.
14. The refractory concrete mix according to claim 11, containing at least one admixture.
15. The refractory concrete mix according to claim 11, containing 1-15 wt.-% binder.
16. The refractory concrete mix according to claim 12, containing the at least one aggregate in amounts between 62.5 and 98.99 wt.-%.

17. The refractory concrete mix according to claim 12, containing the at least one aggregate in amounts between 87.5 and 97.0 wt.-%.

18. The refractory concrete mix according to claim 13, wherein the at least one fine-particle mineral additive is selected from the group consisting of:
binder clay,
microsilica,
alumina meal,
alumina cement (15-32% CaO),
alumina melt cement (32-39% CaO),
Portland cement (60-72% CaO).

19. The refractory concrete mix according to claim 13, wherein the at least one fine-particle mineral additive is selected from the group consisting of:
binder clay up to 15 wt.-%,
microsilica up to 9 wt.-%,
alumina meal up to 30 wt.-%,
alumina cement (15-32% CaO) up to 0.6 wt.-%,
alumina melt cement (32-39% CaO) up to 0.5 wt.-%,
Portland cement (60-72% CaO) up to 0.25 wt.-%.

20. The refractory concrete mix according to claim 14, wherein the at least one admixture is selected from the group consisting of:
additives,
aluminum hydroxide,
pore-forming agents,
stainless steel fibers,
synthetic fibers.

21. The refractory concrete mix according to claim 14, wherein the at least one admixture is selected from the group consisting of:
additives up to 0.5 wt.-%,
aluminum hydroxide up to 0.5 wt.-%,
pore-forming agents up to 0.5 wt.-%,
stainless steel fibers up to 3.0 wt.-%,
synthetic fibers up to 0.3 wt.-%.

22. The refractory concrete mix according to claim 14, wherein the additives are selected from the group consisting of: liquefiers and binding regulators.

23. The refractory concrete mix according to claim 11, containing 1.01-37.5 wt.-% of the binder composition.

24. The refractory concrete mix according to claim 11, containing 3-22.5 wt.-% of the binder composition.

* * * * *